(12) United States Patent
Eyal

(10) Patent No.: US 10,477,259 B2
(45) Date of Patent: *Nov. 12, 2019

(54) SYSTEM AND METHOD FOR MAKING A CONTENT ITEM, RESIDENT OR ACCESSIBLE ON ONE RESOURCE, AVAILABLE THROUGH ANOTHER

(71) Applicant: Crackle, Inc., Culver City, CA (US)

(72) Inventor: Aviv Eyal, New York, NY (US)

(73) Assignee: CRACKLE, INC., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/652,940

(22) Filed: Jul. 18, 2017

(65) Prior Publication Data

US 2018/0007411 A1 Jan. 4, 2018

Related U.S. Application Data

(63) Continuation of application No. 13/864,389, filed on Apr. 17, 2013, now Pat. No. 9,712,857, which is a (Continued)

(51) Int. Cl.
*G06F 21/00* (2013.01)
*H04N 21/258* (2011.01)
(Continued)

(52) U.S. Cl.
CPC ..... *H04N 21/25875* (2013.01); *G06F 16/958* (2019.01); *G06F 21/30* (2013.01);
(Continued)

(58) Field of Classification Search
CPC .......... G06F 21/30; G06F 21/31; G06F 21/41; G06F 21/45; H04L 63/10
See application file for complete search history.

(56) References Cited

U.S. PATENT DOCUMENTS

2003/0184793 A1 10/2003 Pineau
2003/0204472 A1 10/2003 Yamagishi
(Continued)

FOREIGN PATENT DOCUMENTS

JP 2005-250826 9/2005
JP 2006-013996 1/2006
(Continued)

OTHER PUBLICATIONS

Statement in accordance with the Notice from the European Patent Office dated Oct. 1, 2007 concerning business methods (OJ EPO Nov. 2007, 592-593).

*Primary Examiner* — Edward Zee
(74) *Attorney, Agent, or Firm* — Mayer & Williams, PC

(57) ABSTRACT

Systems and methods are provided to make content items, already available on one resource, also available through another, such as through a new location or resource. The content items may be, e.g., videos uploaded by a user or other content. The systems and methods employ a streamlined interface for convenience to the user. In one example, a user of a computer system views a video segment through a first website and re-posts the video segment to a second website by entering a single command or clicking a single button. The websites coordinate the re-posting using credentials previously or contemporaneously entered by the user. Moreover, a content item may be automatically prepared for re-posting on the target website using previously-entered user selections. Playback software from a source website may be posted to a target website to allow access of the content item at the source website.

13 Claims, 11 Drawing Sheets

Related U.S. Application Data continuation of application No. 12/531,216, filed as application No. PCT/US2008/056718 on Mar. 12, 2008, now Pat. No. 8,448,227.

(60) Provisional application No. 60/906,350, filed on Mar. 12, 2007.

(51) Int. Cl.
| | | |
|---|---|---|
| *G06F 21/30* | (2013.01) | |
| *H04L 29/06* | (2006.01) | |
| *G06F 21/41* | (2013.01) | |
| *G06F 16/958* | (2019.01) | |
| *G06F 21/45* | (2013.01) | |
| *G06Q 10/00* | (2012.01) | |
| *G06Q 10/10* | (2012.01) | |

(52) U.S. Cl.
CPC .............. *G06F 21/41* (2013.01); *G06F 21/45* (2013.01); *G06Q 10/00* (2013.01); *G06Q 10/10* (2013.01); *H04L 63/10* (2013.01)

(56) References Cited

U.S. PATENT DOCUMENTS

| | | | |
|---|---|---|---|
| 2005/0246752 A1 | 11/2005 | Liwerant | |
| 2006/0218181 A1 | 9/2006 | Jeon | |
| 2007/0157119 A1* | 7/2007 | Bishop | H04L 67/36 715/810 |
| 2008/0021963 A1* | 1/2008 | Jana | G06Q 10/10 709/206 |
| 2008/0046983 A1* | 2/2008 | Lester | G06F 21/31 726/5 |
| 2008/0189659 A1 | 2/2008 | Lester et al. | |
| 2008/0065604 A1* | 3/2008 | Tiu | G06F 17/30569 |
| 2008/0183803 A1 | 7/2008 | Hassett et al. | |
| 2008/0222199 A1* | 9/2008 | Tiu | G06F 17/3089 |

FOREIGN PATENT DOCUMENTS

| | | |
|---|---|---|
| KR | 1020060090044 | 8/2006 |
| KR | 1020060109233 | 10/2006 |

\* cited by examiner

SYSTEM AND METHOD FOR MAKING A CONTENT ITEM, RESIDENT OR ACCESSIBLE ON ONE RESOURCE, AVAILABLE THROUGH ANOTHER

CROSS-REFERENCE TO RELATED APPLICATIONS

This application is a continuation of application Ser. No. 13/864,389, filed Apr. 17, 2013, which is a continuation of U.S. application Ser. No. 12/531,216, filed Sep. 28, 2009, entitled "SYSTEM AND METHOD FOR MAKING A CONTENT ITEM, RESIDENT OR ACCESSIBLE ON ONE RESOURCE, AVAILABLE THROUGH ANOTHER", which is a national phase application of PCT International Application No. PCT/US2008/056718, which claims priority from U.S. Provisional Patent Application Ser. No. 60/906,350, all of which are incorporated herein by reference in their entireties.

BACKGROUND

Content is available in network systems in many ways. For example, video segments (such as video clips, programs, or movies) may be accessed through websites on the Internet to be viewed or downloaded. A user accessing content on a website through the user's computer system may decide that it would be desirable to make an item of content, currently available on the website, also available on a second website.

In one conventional technique to make the item available on the second website, i.e., to "post" or "publish" the item to the second website, the user may download the data representing the content from the first website (the source website) to the user's computer system and then upload the data from the user's computer system to the second website (the target website).

SUMMARY

Systems and methods are provided to make content items, available on one resource, also available through another, such as through a new location or resource. The content items may be, e.g., videos uploaded by a user or other content. The systems and methods employ a semi-automated interface for convenience to the user. In one example, a user of a computer system views a video segment through a first website and re-posts the video segment to a second website by entering a single command or clicking a single button. The websites coordinate the re-posting using credentials previously or contemporaneously entered by the user.

Features provided in implementations can include, but are not limited to, one or more of the following items. A streamlined re-posting interface may be provided. User credentials may be automatically provided from a source or originating website to a target website. A content item may be automatically prepared for re-posting on the target website using previously-entered user selections. On-demand video content may be provided that was uploaded by a user to the website that provides the posting. Playback software from a source website may be posted to a target website to allow access of the content item at the source website.

In one aspect, the invention is directed towards a method of making available through a target resource a content item, the content item consumable on an originating resource. The method includes receiving a request from a client, the request pertaining to a content item and to a target resource; authenticating the client on the target resource; and if the authenticating is successful, then making available the content item through the target resource by either: transmitting the content item from an originating resource to the target resource; or posting a link to the content item on the target resource.

Implementations of the method may include one or more of the following. The authenticating may include receiving at the target resource a credential of the client; comparing the credential to a list of authenticated credentials; and if the credential of the client is the same as a credential on the list of authenticated credentials, then returning a confirmation that the authenticating is successful. The receiving, authenticating, and making available may be performed at least in part by a server, the server also hosting the originating resource, the target resource, or both. The originating and target resources may be file-sharing sites. The content item may be a video file, an audio file, a multimedia file, or a text file. The method may further comprise receiving at least one preference from a user. The method may further comprise preparing the content item for the target resource according to the received preference. The target resource may be a blog. The method may further comprise transmitting a web application from the originating resource to the target resource. The receiving a credential may include retrieving the credential from a list of one or more stored credentials, or may include prompting the user to enter credential information in a web form.

In another aspect, the invention is directed towards a system for making available through a target resource a content item, the content item consumable on an originating resource. The system includes a receiving module, the receiving module to receive requests for re-postings from a client; an authentication module, the authentication module to authenticate a credential of the client on a target resource; and a re-posting module, the re-posting module re-posting the content item through the target resource by either: transmitting the content item from an originating resource to the target resource; or posting a link to the content item on the target resource.

Implementations of the system may include one or more of the following. The receiving module, authenticating module, and re-posting module may be resident on a server, the server also hosting the originating resource, the target resource, or both. The receiving module, authenticating module, and re-posting module may be configured such that one module is resident on one server and one or more other modules are resident on another server.

In another aspect, the invention is directed towards a method of making available through a target video file-sharing site a video from an originating video file-sharing site. The method includes, during or after playback of a video on an originating video file-sharing site, or contemporaneous with display of a link thereto on the originating video file-sharing site, displaying one or more buttons, each button corresponding to a respective target video file-sharing site; in which if a user at a client activates one or more of the displayed buttons, then authenticating the client on the corresponding target video file-sharing site; and if the authenticating is successful, then making available the video through the corresponding target video file-sharing site by either: transmitting the video from the originating video file-sharing site to the corresponding target video file-sharing site; or posting a link to the video on the corresponding target video file-sharing site, the link pointing to the video on the originating file-sharing site.

Implementations of the method may include one or more of the following. The method may further comprise preparing the video file for the target video file-sharing site according to a preference submitted by the user. The method may further comprise transmitting a web application from the originating video file-sharing site to the target video file-sharing site. The authenticating may include receiving at the target video file-sharing site a credential of the client; comparing the credential to a list of authenticated credentials; and if the credential of the client is the same as a credential on the list of authenticated credentials, then returning a confirmation that the authenticating is successful. The receiving a credential may include retrieving the credential from a list of one or more stored credentials.

In another aspect, the invention is directed towards a method of providing video data from a source computer system to a target computer system. The method includes storing at a source computer system content data for an item of user-uploaded video, in which the content data includes data representing the item of user-uploaded video and data describing the item of user-uploaded video; storing at the source computer system user credentials identifying a user for a target computer system; storing at the source computer system user preferences indicating parameters for providing data through the target computer system; receiving a selection of a video content item of user-uploaded video; receiving a re-post command, in which the re-post command indicates the target computer system; sending the user credentials to the target computer system; receiving confirmation of the user credentials from the target computer system; sending the user preferences to the target computer system; and sending a link to the video content data to the target computer system or sending at least part of the video content data to the target computer system.

Other advantages and features of the invention will be apparent from the description that follows, including the drawings and claims.

DETAILED DESCRIPTION

Figure 1:
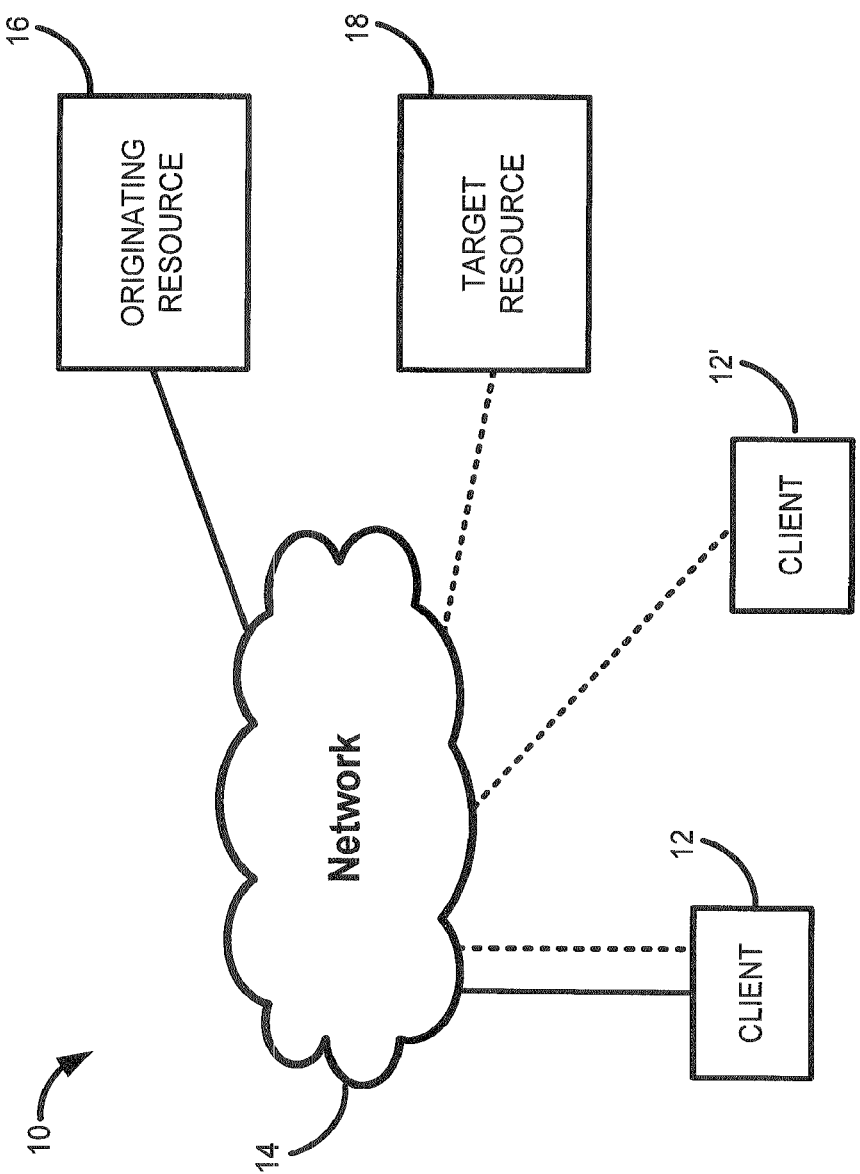
FIG. 1 illustrates a schematic depiction of a system for re-posting.

The following definitions are employed in this description.

"Items of content" or "content items" refer to digital data files or other such media files that one user may forward to another, or about which one user may forward information or an indicator about to another user. Examples include media files such as audio files or video files, such as video clips, songs, television shows, or movies. Other examples include videogames and other digital media, such as screensavers, ringtones, and widgets. Content items may in some cases refer to non-media items, such as data files or application software. For video files, content items may be user-uploaded video that is user-generated, that is created by a user (e.g., video recorded by a user with a video camera), or from any other source. In other implementations, different types of video or other content may be used, e.g., commercially-produced video, or commercial or user-uploaded audio or other data.

An "originating resource", "source website", or the like refers to the resource that a user originally used to access a content item. This user access may be minimal, as the user need not have played back the content item on the originating resource at all. In any case, the originating resource becomes the source of the content item to the target resource employing the methods disclosed. The originating resource may continue to be a source of the content item to the target resource, in the case where only a link is transferred to a target resource, or the originating resource may transmit the content item, or a copy thereof, to the target resource, in which case access to the originating resource need no longer be made. A "link" in this description is any software device used to allow a recipient to obtain access to or to play back a content item on a resource.

A "target resource" or "target website" refers to the resource through which the user desires to consume the content item. As noted above, the content item may reside on the target resource, or only a link thereto may reside on the target resource. The target resource may be a social networking site, a file-sharing site such as a video file-sharing site, a blog, or a user web site.

Either the originating resource or the target resource or both may be a media content site, which is a website through which users can share digital media items. Such a site is often combined with a level of social networking. Examples of such sites in this definition including Crackle™, YouTube®, MySpace®, Facebook®, Ning and the like. Such sites may include not only single domain networks but also those that span multiple domains with common backend functions.

"Re-posting" a content item from a source resource to a target resource refers to placing an indicator of the content item on the target resource, placing a link to the content item on the target resource, placing a portion of the data representing the content item on the target resource, or placing all of the data representing the content item on the target resource. Re-posting includes making an item of content, originally on an originating resource or source website, available through or on a target resource or target website.

To "consume", "play" or "play back" a content item refers to the act of displaying or presenting a content item. For example, playing back a content item that is a video clip means to display and show the video clip in an appropriate video clip player (e.g., through the display of a computer system). Playing back a content item that is an audio clip means to render it so it may be listened to or otherwise consumed. The media player may be any content playback device that is capable of playing back the selected type of content.

A "web form" is a form employed on a resource with which a user may indicate that they wish to re-post a content item on one or more target resources. The same may often be used in conjunction with a Flash® or other such executable media player to play the content item. In this context, the term may used for even non-web forms, such as executable mobile applications that may be specific to handset devices, such as may be implemented in Java® or BREW® forms.

A "social networking site" is an online community of users usually connected via the Internet. The users can typically interact with each other via messaging and email, and can express preferences to each other about various interests and groups. An exemplary social networking site is Crackle™. Many of these are particularly suited for sharing video or image data, including Crackle™. These are also termed herein as video or image "file-sharing sites".

Other definitions are given below, in the context of the description.

Referring to the system 10 of FIG. 1, a user is connected to a network 14 using a client 12. Through the network 14, the user may visit an originating resource 16, and may access or select a given content item thereon. The user may then wish to re-post the content item on a target resource 18. Following re-posting, the user of client 12 or the user of client 12' may access the content item through the target resource 18 rather than through the originating resource 16.

Figure 2:
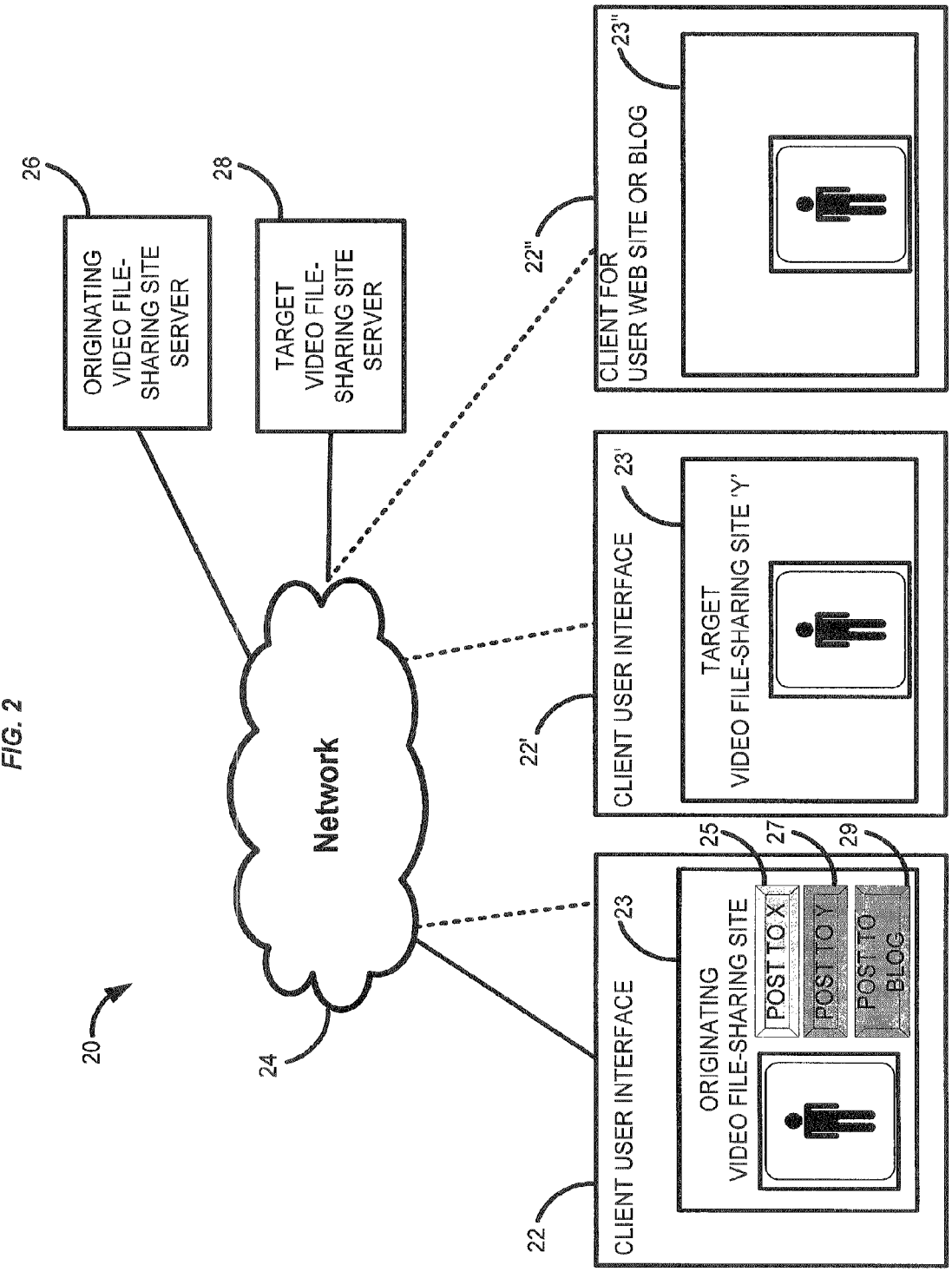
FIG. 2 illustrates another schematic depiction of a system for re-posting, this depiction specific to video and video file-sharing sites.

FIG. 2 illustrates a system 20 specific to a video file-sharing system. A user may select a video content item, and the user's client 22 has a user interface on which is displayed the video content item from an originating video file-sharing site 23. A backend for the same is illustrated as originating video file-sharing site server 26, which is accessible through the network 24. Several clickable buttons are disposed on the user interface for the site 23, including a "POST TO X" button 25, a "POST TO Y" button 27, and a "POST TO BLOG" button 29. By clicking any of these buttons, the user can instruct the originating video file-sharing site to make the selected video content item available, using a simple interface, through a target resource, shown in FIG. 2 as residing on a target video file-sharing site server 28.

For example, by clicking button 27, the user can instruct the originating video file-sharing site to make the selected video content item available through target video file-sharing site Y, displayed on user interface 23' on client 22'. Of course, user interface 23' may be displayed on client 22 or on any other client as well.

The results of the re-posting are not limited to public or private video or other file-sharing sites. For example, re-posting of content items may occur where the target resource is a user website or blog 23", shown in FIG. 2 on a client system 22". re-posting on a blog or user website may result from the user clicking button 29 in FIG. 2. Methods of authentication, to allow such re-posting, are discussed below.

Figure 3:
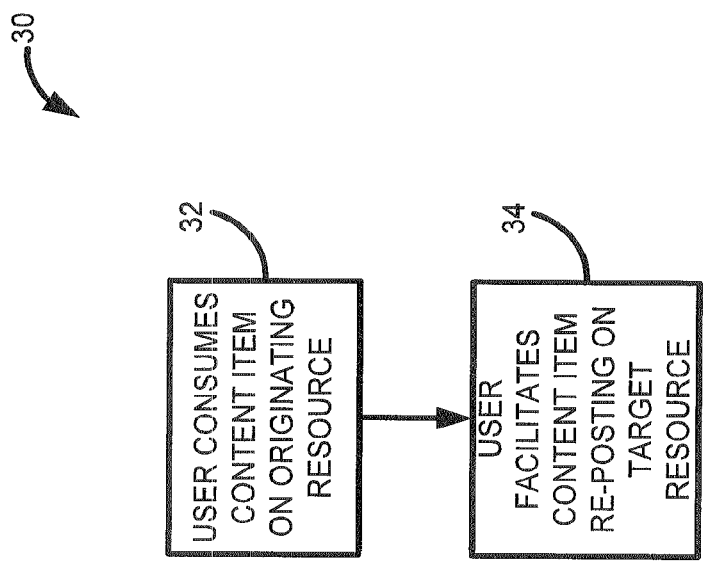
FIG. 3 illustrates a flowchart of a method for re-posting.

FIG. 3 illustrates an exemplary method 30 for re-posting or for making available a content item from an originating resource on a target resource. The first step is that the user consumes the content item on the originating resource (step 32). This consuming may be very minor, and need not entail playing back the entire content item. In particular, the consuming may merely be selecting the content item. In one implementation, a user is connected to a first website (a source website) and has selected a video item representing a segment or portion of a video file previously uploaded to the source website by the user or by another user, or by the operator or provider of the website. The video item is stored as data in the computer system operating the source website. In another implementation, the content item is a link to a content item stored elsewhere (e.g., a content item that has been re-posted to this website).

Figure 4:
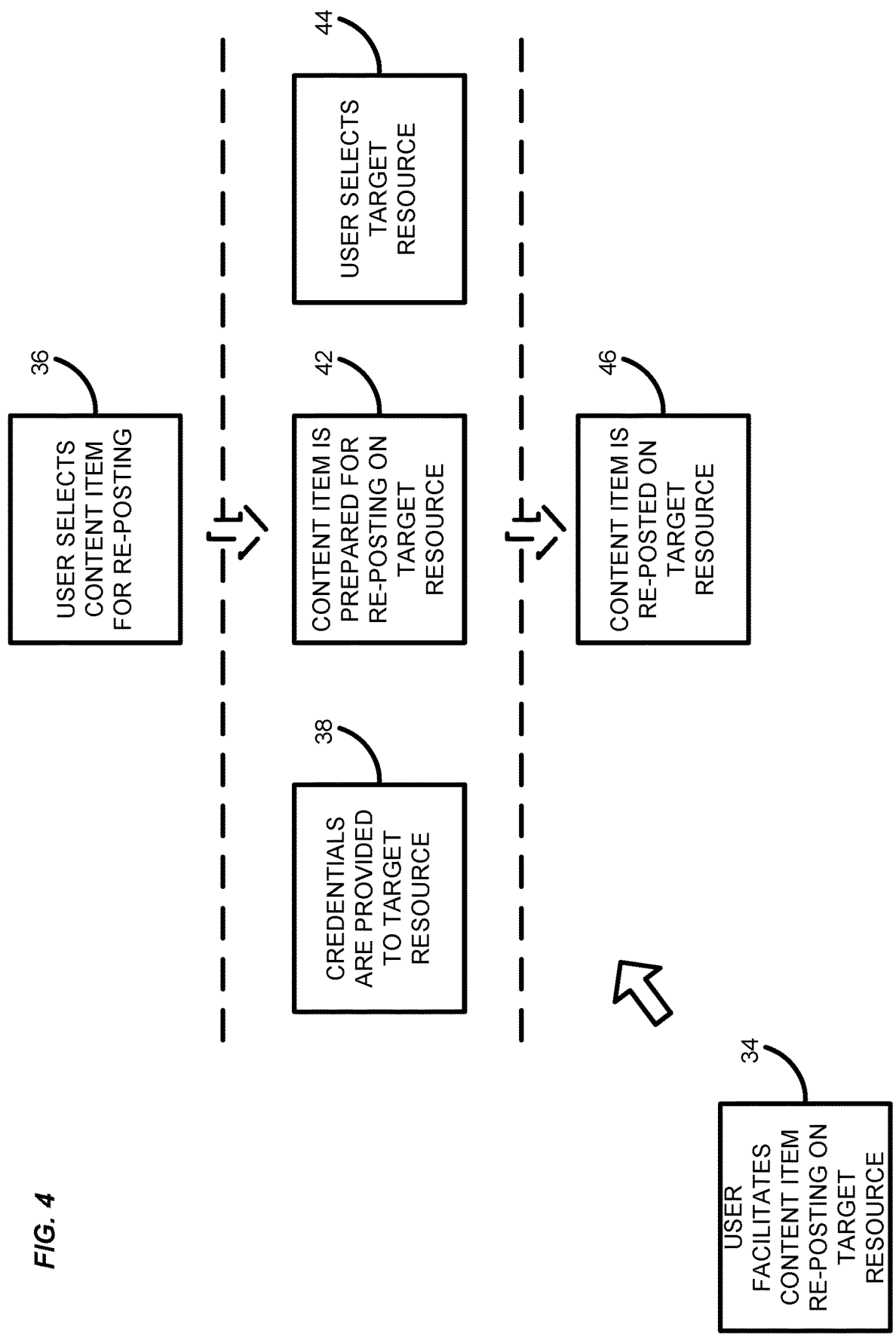
FIG. 4 illustrates a more detailed flowchart, showing in more details steps that correspond to the method of FIG. 3.

The user then facilitates the re-posting of the content item on a target resource (step 34). FIG. 4 illustrates additional details of the step of facilitating re-posting. The figure is arranged in a top-down fashion, though the steps need not be performed in any particular order. While the steps will be described in greater detail below, here it is noted that the steps may include: selecting a content item for re-posting (step 36), selecting a target resource (step 38), providing credentials to a target resource (step 42), preparing a content item for re-posting at a target resource (step 44), and re-posting or otherwise making the content item available through the target resource (step 46).

Figure 5:
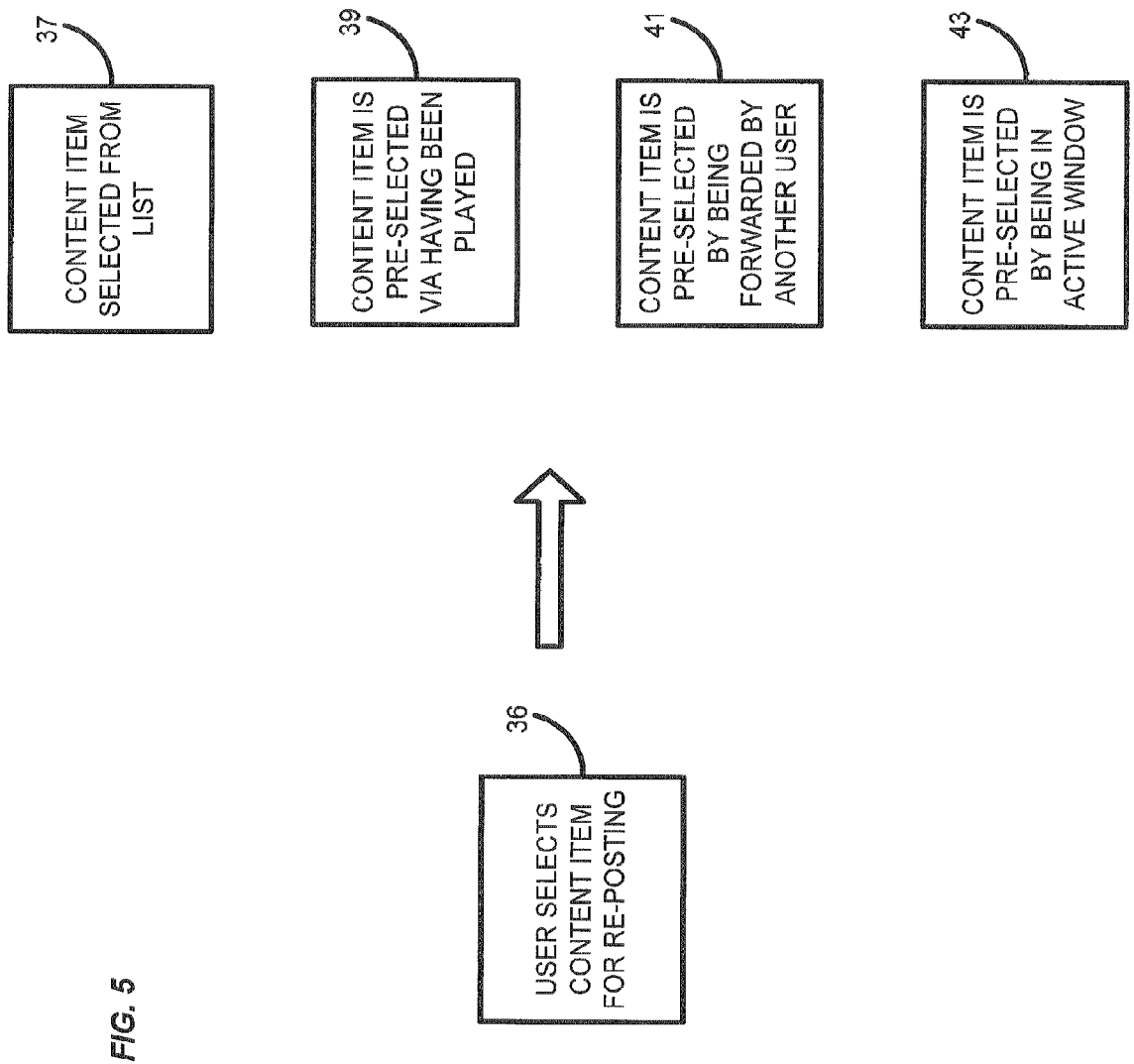
FIG. 5 illustrates a more detailed flowchart, showing steps that correspond to the content item selection step of FIG. 4.

The first step is that the user selects a content item for re-posting (step 36). This step may be omitted if the user consumption step (step 32) has already provided such a selection. Referring to FIG. 5, the user may choose the content item from a list (step 37), or the content item may be, by default, "selected" during or after playback (step 39). The content item may be automatically selected if the user has been forwarded a link or other indicator to the content item by another user (step 41), such as in an email message or instant messaging application. In one such implementation, the content item can be accessed and re-posted from within the message (or messaging application), such as by including re-posting controls with the presentation interface of the content item. In another exemplary implementation, the content item may be selected if the same is in an active window (step 43). Other variations are also possible.

Figure 6:
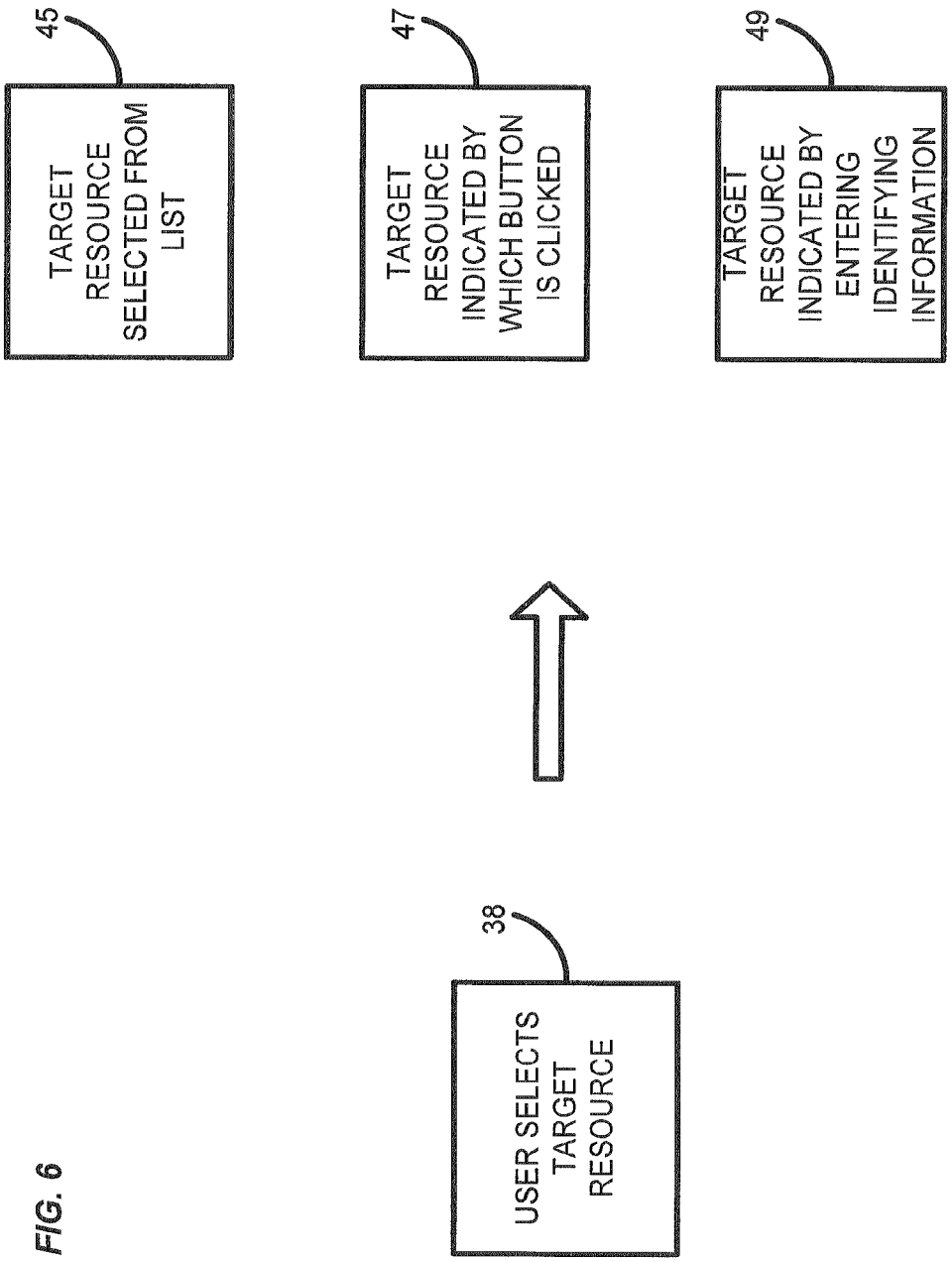
FIG. 6 illustrates a more detailed flowchart, showing steps that correspond to the target resource selection step of FIG. 4.

Referring to FIG. 6, a next step is that the user selects a target resource to which the content item is desired to be re-posted (step 38). This step may also be omitted if the nature of the user consumption step (step 32) has already provided such a selection. For example, the user may select a "post" command, such as is shown on FIG. 2, by using a mouse to click on a "post" button in a web page of the resource or website presented through a web browser application executing on the user's computer system. In FIG. 2, the identity of the target resource is determined by which button is clicked (step 47). If the identity of the target website is not predetermined, the user may then indicate (in a separate step) to which target website to re-post the selected item, such as by selecting the target website from a list (step 45) or by entering identifying information (step 49). In another example, a user can open a context-sensitive menu (e.g., by operating a mouse input device to click on the image, using an alternative control button, such as by "right-clicking" on the image) to access a command to post to a particular target, to open a list of targets, or to access a target entry/selection tool.

Figure 7:
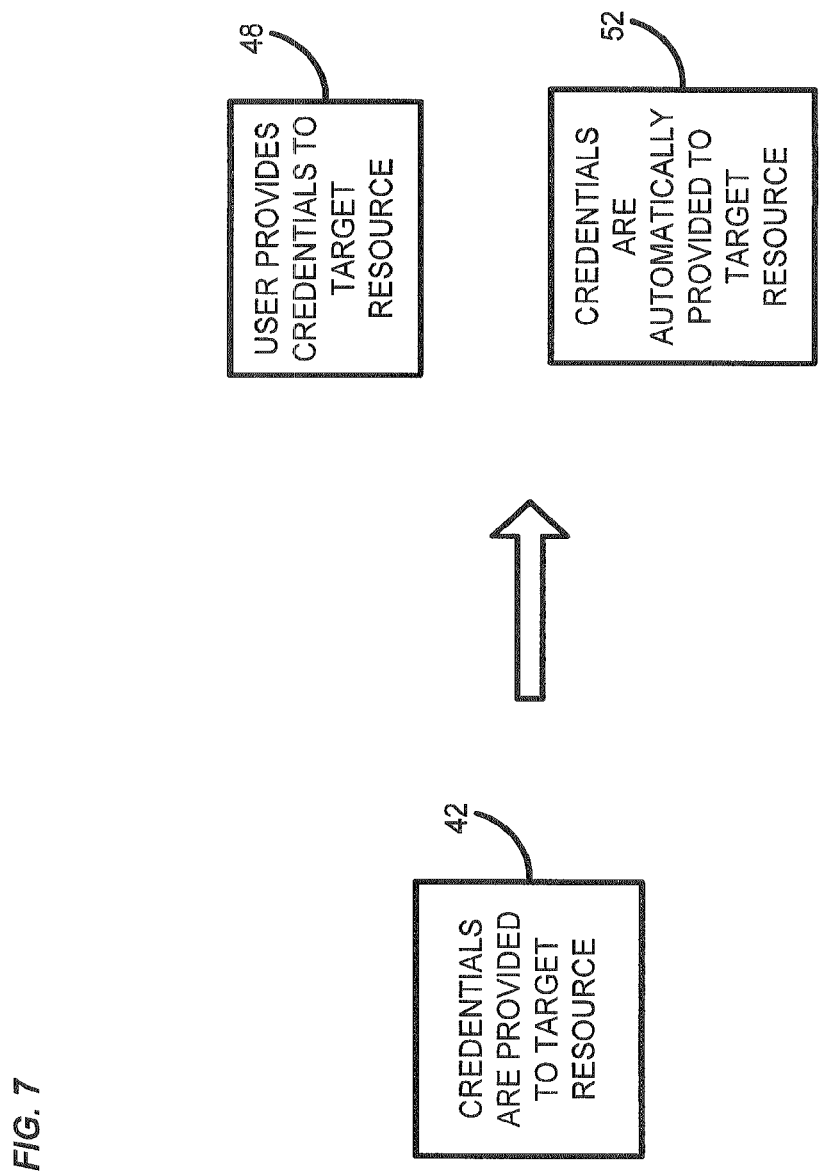
FIG. 7 illustrates a more detailed flowchart, showing steps that correspond to the authentication step of FIG. 4.

Referring to FIG. 7, a next step may include authentication of the user's credentials prior to performing re-posting. In particular, the source website or originating resource checks its records to determine if the user has previously entered credentials and preferences for the selected target website. Examples of credentials include a site identity or a name and password. If so, credentials may be automatically provided to the target resource (step 52). If the user has not previously provided any information, the user may be prompted by the originating resource to provide credentials to the target resource prior to the re-posting being performed (step 48). Alternatively, the system may present any stored information to the user for editing or additions, such as through a template or web form with complete or incomplete information. In other variations, alternative sources of stored credentials can be used, including but not limited to: the target website, the client system (stored data provided automatically to the target website), or an identity broker site.

Figure 8:
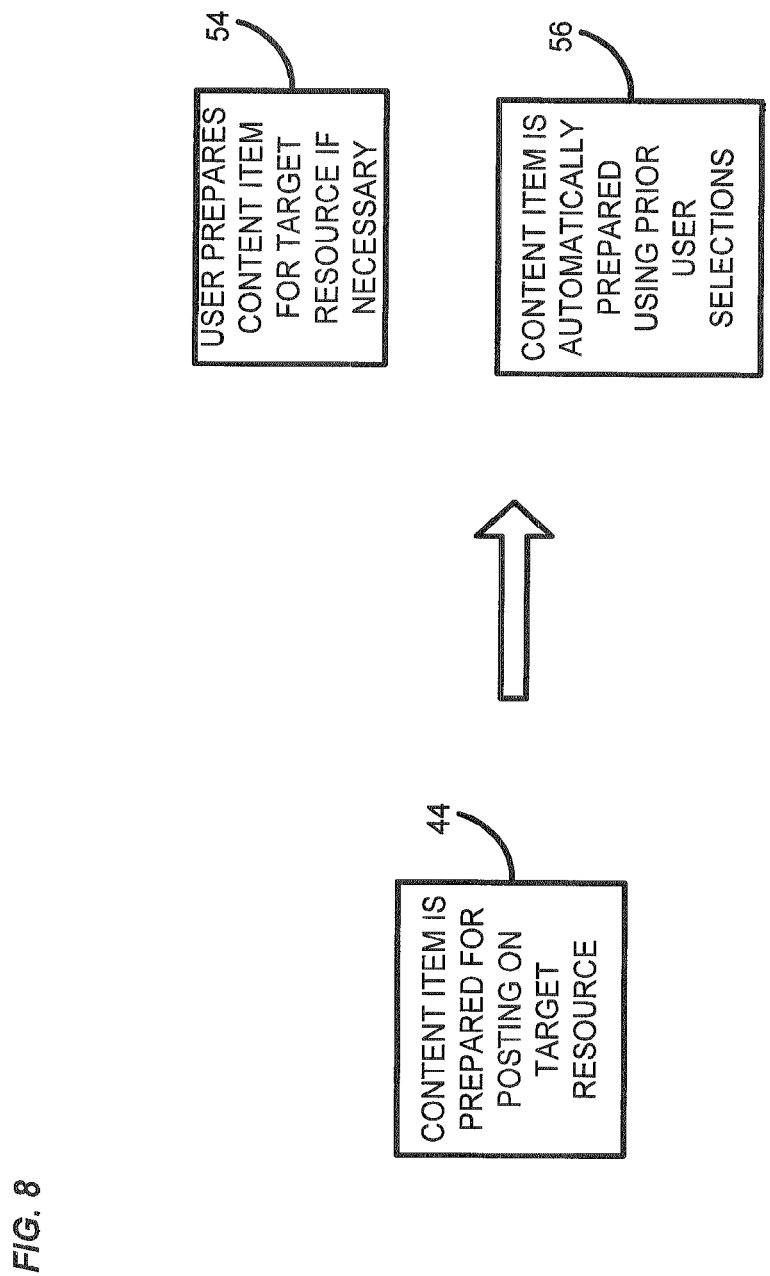
FIG. 8 illustrates a more detailed flowchart, showing steps that correspond to the content item preparation step of FIG. 4.

Referring to FIG. 8, a next step, which is optional, may include preparation of the content item prior to performing re-posting on the target resource. This preparation may include consideration of user preferences for re-posting, in addition to technical requirements of the target resource. As with the credentials, the source website or originating resource checks its records to determine if the user has previously entered preferences for the selected target website. Examples of preferences include publishing options, location (e.g., blog name, page name, screen location), data format, title format, and access rules. The preferences may differ for different target sites. For example, one site may provide for different access rules than another. If so, preferences may be automatically provided and used for modifying, reformatting, or otherwise adjusting the content item to the target resource (step 56). In general, for such modifications, a copy is made of the content item and the copy or an edited version is then re-posted. If the user has not previously provided any information, the user may be prompted by the originating resource to provide preferences about the target resource prior to the re-posting being performed (step 54). Alternatively, the system may present any stored information to the user for editing or additions, such as through a template or web form with complete or incomplete information. In another variation, the preparation includes the generation of metadata that is then sent with the content item to the target. The target website can use the metadata to adjust the content item or associate the metadata with the content item, such as for searching or indexing.

Figure 9A:
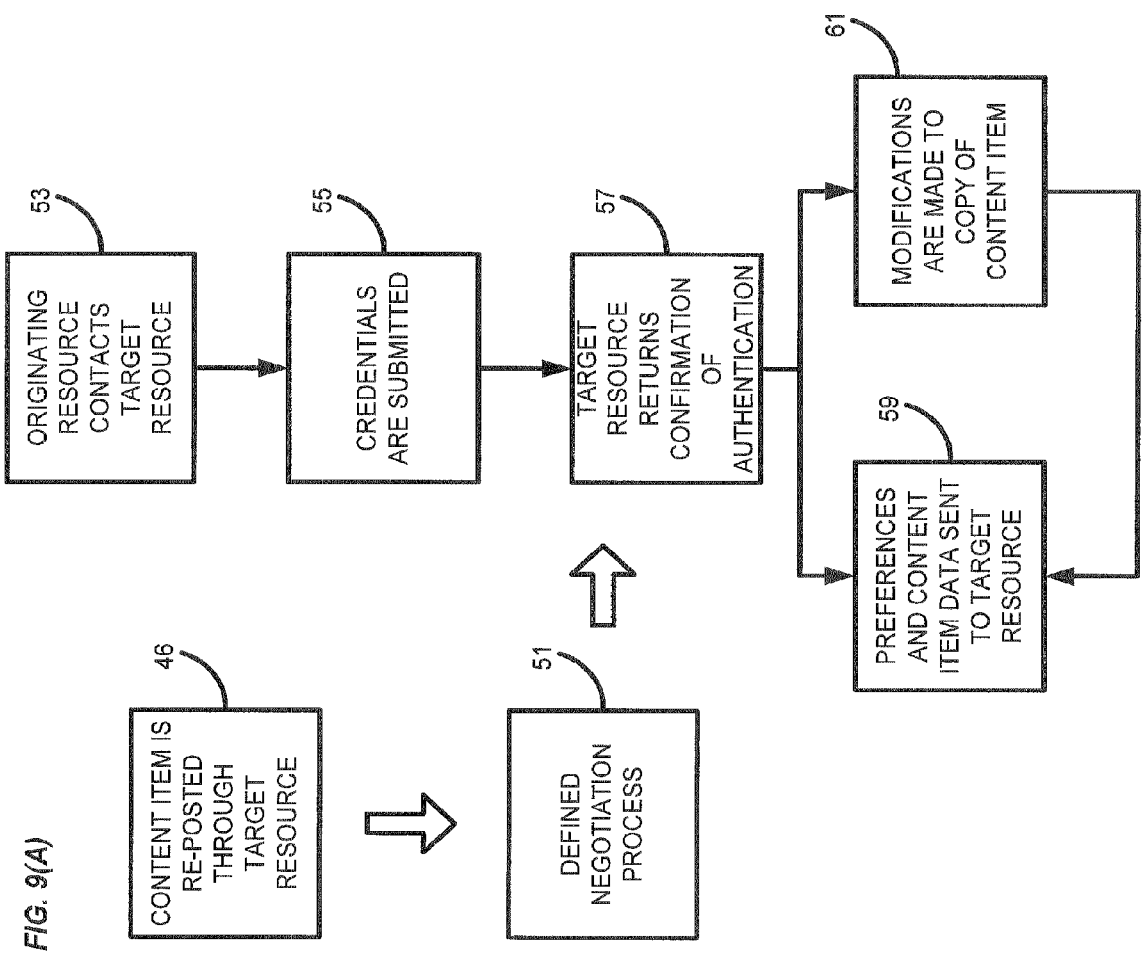
FIGS. 9(A) and 9(B) illustrate a more detailed flowchart, showing steps that correspond to the re-posting step of FIG. 4.

Referring to FIG. 9(A), if the system already has the credentials and preferences stored, or after receiving new or updated information, the originating resource and the selected target resource conduct a defined negotiation process for compatible systems (step 51).

First, the originating resource contacts the target resource (step 53). Next, the originating resource provides the user's credentials to the target resource (step 55). The originating resource waits for confirmation or authentication from the target resource, and if the same is received (step 57), the process can continue. After receiving confirmation, the originating resource may send the preferences and data for the selected content item to the target resource (step 59). Alternatively, if any modifications to the data are needed based on the stored preferences, the originating resource may make those modifications (step 61) to a copy of the data and may then send the modified copy to the target resource (step 59).

Figure 9B:
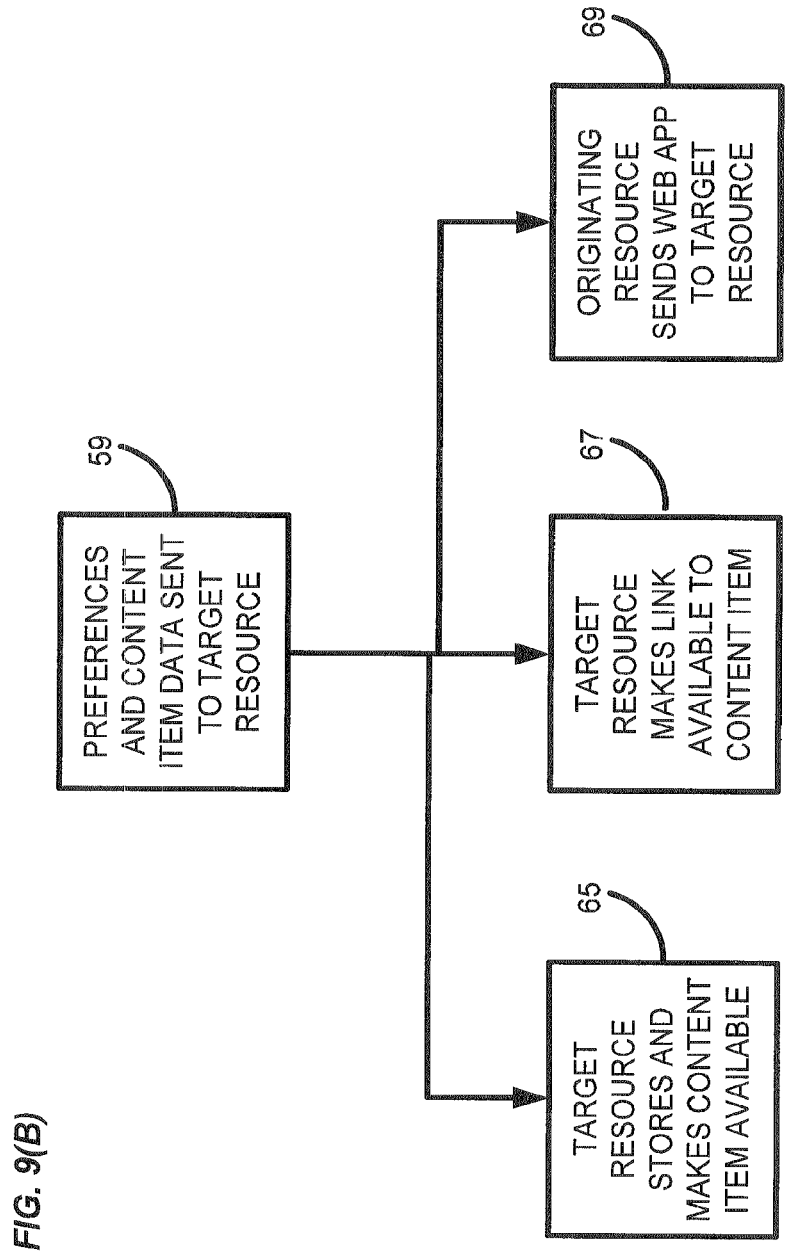

Referring in particular to FIG. 9(B), the target resource receives and stores the data and makes the item available (step 65), according to the received preferences. Alternatively, the originating resource continues to host the content item and does not forward all the data for the content item to the target resource. Instead, the target resource creates a link that leads back to the originating resource to access the data for the item (step 67). Besides the link, other additional data may also be transferred and provided, e.g., a thumbnail image or a single image to build an icon, or metadata to facilitate searching and classification on the target resource.

In another example, the data is published to the target resource using a published web API, e.g., Wordpress® or Blogger.com®, or by automated interactive content editing on behalf of the user, e.g., Friendster®, and so on.

Figure 10:
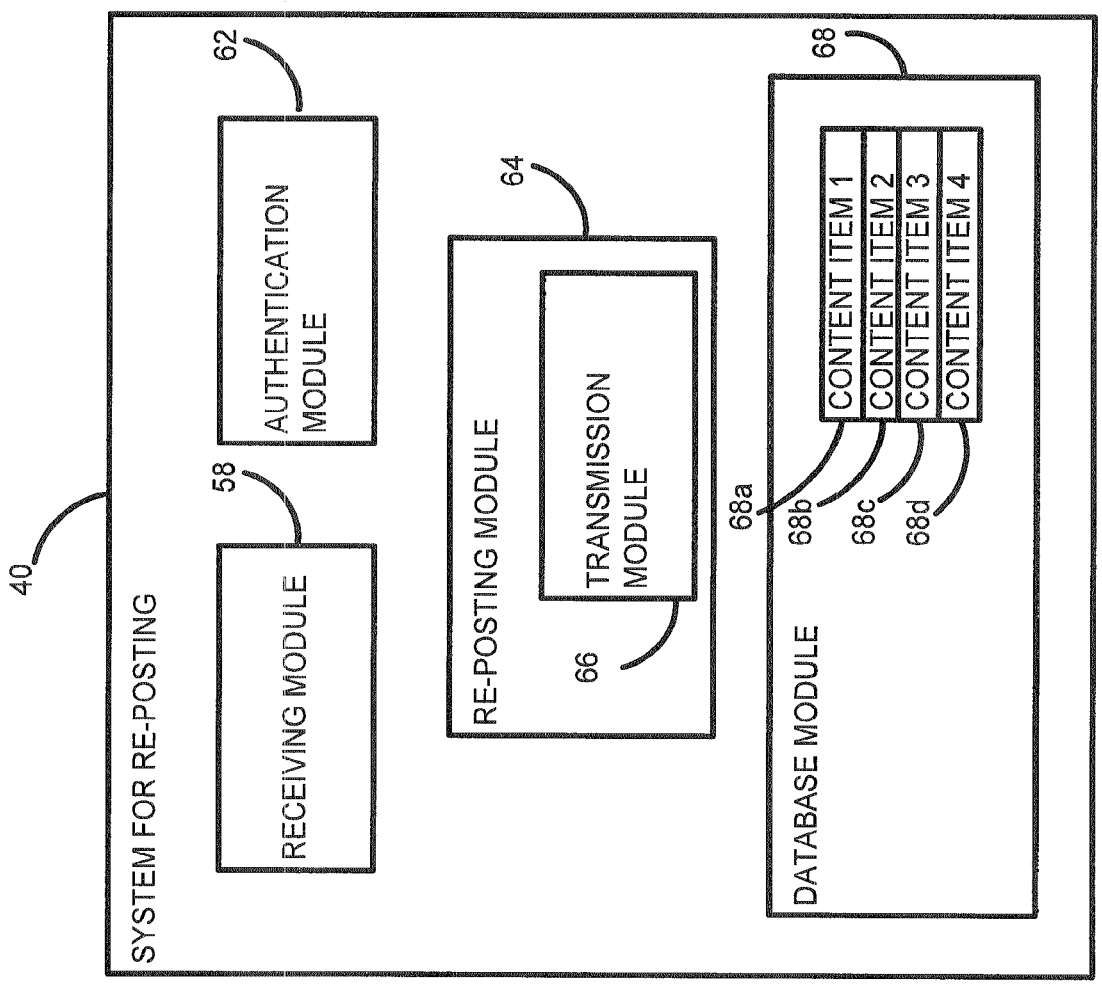
FIG. 10 illustrates a more detailed schematic modular depiction of a system for re-posting.

FIG. 10 illustrates a schematic modular diagram of a system 40 that may be employed for re-posting. A receiving module 58 receives requests for re-posting of a content item. The receiving module may be disposed on the same or a different server as the originating resource. Upon clicking a "re-post" button, the receiving module may receive notification that the content item is to be re-posted and may send a signal to an authentication module to arrange for confirmation that the user is authorized to re-post on the selected target resource. The authentication module 62 sends credentials of a user to a target resource, and receives confirmation of successful authentications. Upon receipt of the successful confirmation, the authentication module notifies a re-posting module that re-posting may occur on the target resource. The re-posting module 64 with accompanying transmission module 66 sends preferences and content data (or a link is created thereto) to the target resource. The link if any may be created by the originating resource, the target resource, the re-posting module, or by an intermediate source. A database module 68 is shown which contains a number of content items stored thereon, shows as content items 68a-68d. The database module may be located on the originating resource, or as noted above may be part of a central database from which one or more originating or target resources, or both, refer. In one example, the re-posting system is accessed through a re-posting application executing on a client system in conjunction with a browser application. The tool operates as the interface to the re-posting system for the user. In one variation, the re-posting tool interacts with the source and target websites to control the re-posting of a content item (e.g., through known interfaces of the compatible websites).

Of course, these modules may be physically resident on any number of computing devices, and may employ an appropriate protocol to communicate between each other, e.g., to transmit content items and/or accompanying metadata or other data representing and describing the content item. For example, the database module may be embodied in a central store of content items, accessible by a number of source and target resources or websites.

Benefits inure to the use of the described systems and methods. For example, in some implementations, a user need only enter credentials for a target resource or website once. The originating resource, or source website, stores the credentials and uses them automatically for re-posting thereafter. Similarly, the user need only enter preferences once. Generally, the preferences may be used for multiple target resources, as appropriate. In addition, the actions that the user performs to re-post from the originating resource to the target resource are simplified. Depending on the requirements of the target resource and the design of the originating resource interface, a single mouse-click may be sufficient to re-post a selected item from the originating resource to the target resource. This type of implementation allows for smooth and rapid sharing of user-uploaded videos by the author and by other users to various websites and services.

In another example, in lieu of sending, e.g., video data, for a selected content item to the target resource, the originating resource sends to the target resource a web application or a component of a web application (step 69), such as a flash-based video player that provides playback of the video. In this case, the originating resource does not send the video data itself; rather, it continues to host the video data. For playback, the target resource provides the received web-based video player as a playback mechanism to access the video data stored on the originating resource.

Different implementations may employ variations of this structure as well. For example, some or all of the video data for a content item may be stored at multiple locations and the target resource may be provided with information to allow the playback software to locate the distributed data. In one such example, the re-posted content item is a link that causes a peer-to-peer download to occur, possibly from multiple peers using segmented downloading. In another variation, the originating resource does not store content items but may, e.g., store identification information and/or playback software. For example, content items may be stored in a central location for all referring resources. In one such case, the data passed from the originating resource to the target resource is location information (and credential information as needed) to access the central store of content items.

According to embodiments of the present invention, as fully described above, systems and methods are provided for making content items resident on a source website available through or on a target website. Using the disclosed system, the user need not download and upload the data for the content item but instead may cause the source and target websites to handle the transaction.

Variations of the above description will be apparent to one of skill in the art given this teaching. For example, the modules described may be spread over two or more servers, rather than only one. Further, one or more modules may be disposed on the same server as the originating resource or the target resource. In many cases, in particular, it may be that the originating resource is hosted on the same system as the modules described above.

Moreover, while the discussion above has focused on re-posting videos to a target website, other types of content items can also be re-posted, such as, but not limited to, audio, images, text, multimedia files, data, or executable code, e.g., software. In another example, the source and/or target website can be different types of computer systems, such as an FTP server system, a peer user computer system, e.g., for peer-to-peer posting, or another type of computing device.

One implementation includes one or more programmable processors and corresponding computer system components to store and execute computer instructions, such as to provide the computer systems implementing the user computer system, the system providing the source website, and the system providing the target website.

While the term "computer" has been used, this term is intended to encompass any computing machine, including desktop computers, laptop computers, handheld computers, tablet computers, smart phones, personal digital assistants, and any other device to or from which data may be transferred. Various other examples could also be formulated given this teaching.

While the invention has been described with respect to certain embodiments, it should be clear to one of ordinary skill in the art, given this teaching, that the invention is much broader than the embodiments shown. Accordingly, the description represents some, but not all, representations, and therefore the scope of this invention is to be limited only by the claims appended to this description.

The invention claimed is:

1. A method of making a content item available through a target resource, comprising:
    receiving at the target resource a request from a client device, the request indicating re-posting of the content item from an originating resource, and further receiving metadata associated with the content item;
    authenticating the client device with the target resource, wherein the authenticating includes, upon receiving the request, receiving at the target resource a credential of the client device, comparing the credential of the client device to a list of authenticated credentials, and if the credential of the client device is the same as an entry on the list of authenticated credentials, then returning a confirmation that the authenticating is successful;
    if the authenticating is not successful, requesting user credentials from the client device, the requesting including presenting stored information for editing or adding;
    publishing at the target resource a link to the content item, the link indicating the content item and the originating resource, and associating the content item with the received metadata such that a searching or indexing step at the target resource uses the received metadata; and
    when the link is activated, causing playback of the content item through a player on the target resource.

2. The method of claim 1, wherein the receiving, authenticating, and publishing are performed at least in part by a server, the server also hosting the originating resource, the target resource, or both.

3. The method of claim 1, wherein the originating and target resources are file-sharing sites.

4. The method of claim 1, wherein the content item is a video file, an audio file, a multimedia file, or a text file.

5. The method of claim 1, further comprising receiving at least one preference from a user.

6. The method of claim 5, further comprising preparing the content item for the target resource according to the received preference.

7. The method of claim 1, wherein the target resource is a blog.

8. The method of claim 1, further comprising transmitting a web application from the originating resource to the target resource.

9. The method of claim 1, wherein the receiving the credential includes retrieving the credential from a list of one or more stored credentials.

10. The method of claim 1, wherein the receiving a credential includes prompting a user to enter credential information in a web form.

11. A system disposed on a target resource for making a content item available through the target resource, comprising:
    a receiving module, the receiving module to receive requests from a client device, the requests indicating re-postings of the content item from an originating resource, and further to receive metadata associated with the content item;
    an authentication module, the authentication module to authenticate a credential of the client device with the target resource, wherein the authenticating includes, upon receiving the requests, receiving at the target resource the credential of the client device, comparing the credential of the client device to a list of authenticated credentials, and if the credential of the client device is the same as an entry on the list of authenticated credentials, then returning a confirmation that the authenticating is successful, and if the authenticating is not successful, requesting user credentials from the client device, the requesting including presenting stored information for editing or adding; and
    a re-posting module, the re-posting module to publish at the target resource a link to the content item, the link indicating the content item and the originating resource, such that when the link is activated, the content item is caused to play back through a player on the target resource, the re-posting module further to associate the content item with the received metadata such that a searching or indexing step at the target resource uses the received metadata.

12. The system of claim 11, wherein the receiving module, authenticating module, and re-posting module are resident on a server, the server also hosting the originating resource, the target resource, or both.

13. The system of claim 11, wherein the receiving module, authenticating module, and re-posting module are configured such that one module is resident on one server and one or more other modules are resident on another server.

* * * * *